June 7, 1955　　　　　G. DE CHANGY　　　　　2,710,145
CARRY-OVER MECHANISM FOR COUNTERS
AND CALCULATING MACHINES
Filed Jan. 7, 1954　　　　　　　　　　　　　8 Sheets-Sheet 4

Inventor
G. de Changy
By Glenn N. Downing Reebold
Attys.

June 7, 1955     G. DE CHANGY     2,710,145
CARRY-OVER MECHANISM FOR COUNTERS
AND CALCULATING MACHINES
Filed Jan. 7, 1954     8 Sheets-Sheet 6

Inventor
G. de Changy

June 7, 1955

G. DE CHANGY 2,710,145

CARRY-OVER MECHANISM FOR COUNTERS AND CALCULATING MACHINES

Filed Jan. 7, 1954

Inventor
G. de Changy
By Glascock Downing Seebold
Attys.

United States Patent Office 2,710,145
Patented June 7, 1955

2,710,145

CARRY-OVER MECHANISM FOR COUNTERS AND CALCULATING MACHINES

Gilbert De Changy, Clamart, France, assignor to Electricité de France—Service National—Direction des Études et Recherches, Paris, France Application January 7, 1954, Serial No. 402,634

Claims priority, application France January 8, 1953

8 Claims. (Cl. 235—137)

The object of the present invention is a carry-over device for calculating machines in which the results of operations are recorded on toothed wheels, each one of them assigned to a predetermined order and mounted free on one shaft; this carry-over device is characterized mainly by the combination of a carry-over control shaft constantly driven in rotation, synchronously with the control shaft of the machine, of carry-over pinions mounted on this carry-over control shaft, equal in number to the number of toothed wheels less one, each one of them cooperating with one toothed wheel and capable of causing said toothed wheel to record carry-overs, and means assigned to each pinion and controlled each by the toothed wheel of the next lower order than that with which said carry-over pinion cooperates, for making said carry-over pinion active and cause it to record one unit on the toothed wheel with which it cooperates when the toothed wheel of the next lower order records one unit more than its maximum capacity, i. e. 10 units in the case of the decimal system.

According to a first mode of embodiment of the invention, the carry-over pinions are normally locked by the toothed wheels of the next lower order to that of the toothed wheel with which they cooperate, and they are released and driven by friction by the auxiliary shaft on which they are mounted for effecting the carrying over of one unit on the toothed wheel with which they cooperate only at the time when the toothed wheel of the next lower order records one unit more than its maximum capacity.

According to a second mode of embodiment of the invention the carry-over pinions are constantly positively driven, with no braking whatsoever by the auxiliary control shaft with no other energy absorption than that necessary for their rotation, except at the time when they are made active and cause a carry-over on the toothed wheels with which they cooperate.

To this effect, all toothed wheels, except that of the lowermost order, are associated in rotation with a ratchet arranged on the side of the toothed wheel of the next lower order and each toothed wheel, except that of the highest order, drives a device placed on the side of the toothed wheel of the next higher order and capable of cooperating with the ratchet of said toothed wheel of the next higher order, this device not cooperating, in its normal position with said ratchet of the toothed wheel of the next higher order, and being arranged so that the carry-over pinion corresponding to said toothed wheel of the next higher order modifies its relative position with respect to the toothed wheel which drives it in rotation, each time said toothed wheel records one unit more than its normal capacity, and then drives it itself in rotation at a peripheral speed equal at least to that at which it was driven in rotation by said toothed wheel, so that it causes a rotation of one tooth of the ratchet of the toothed wheel of the next higher order and consequently causes the carrying over of one unit on said toothed wheel of the next higher order.

The appended drawing shows, by way of example, these various modes of embodiment of the invention:

The same reference numerals but modified are used in the various figures for designating the same elements.

Figure 1:
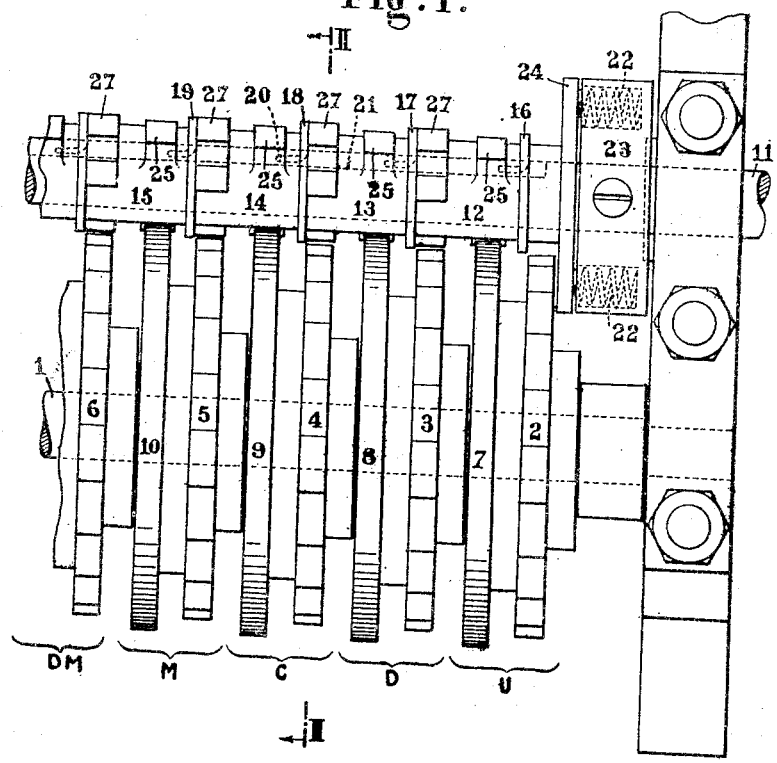
Figure 1 is a view in elevation of the first mode of embodiment.

On the shaft 1 of the totalizer, are mounted free the toothed wheels for the units 2, tens 3, hundreds 4, thousands 5 and tens of thousands 6; each one of these wheels comprises 20 teeth, i. e. more than the generally required minimum of 13, and two teeth correspond to each unit; each one of these toothed wheels, except that of the tens of thousands 6, is associated in rotation with an unlocking ring 7, 8, 9 and 10.

The recording of the operations by these toothed wheels is controlled by a device of any type, not shown.

The carry-over shaft 11 is driven in rotation in synchronism with the control shaft of the machine by a device not shown.

On this shaft are mounted free the carry-over pinions 12, 13, 14, 15 with each one of which is associated a washer for friction driving 16, 17, 18, 19; these washers and pinions can slide freely on the shaft 11; these washers comprise, each one of them, a bent stud 20, engaged in a groove 21 of the shaft 11 by which they are driven positively in rotation.

Spiral springs 22, six in number, for instance, are mounted barrel-wise in blind holes provided in a socket 23 associated in rotation with the shaft 11 and constantly exert a pressure against the plate 24 which transmits said pressure to all friction drive washers 16, 17, 18, 19 and to the corresponding carry-over pinions 12, 13, 14, 15.

Each one of these carry-over pinions comprises two parts, offset longitudinally.

Figure 2:
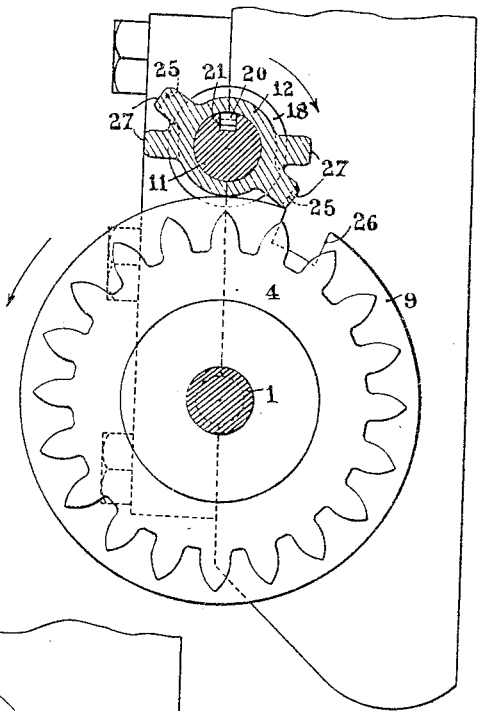
Figure 2 is a view in section along line II—II in Fig. 1.
Figure 3:
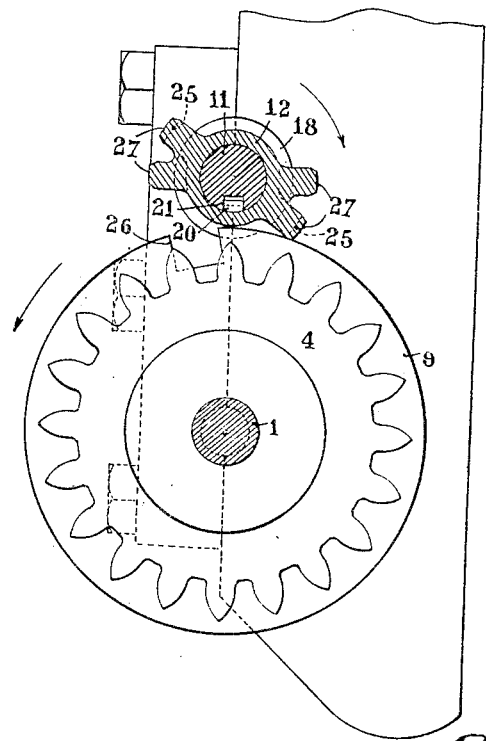
Figure 3 is a similar view showing the same elements in the positions they occupy after the carrying over of one unit.

A first part is provided with two teeth 25, diametrically opposite, normally locked against the unlocking cam of an order which prevents it from rotating, and capable of cooperating with a corresponding recess 26 in the same unlocking cam which allows it a 180° rotation, controlled by the shaft 11 and the corresponding friction drive washer when the toothed wheel with which it is associated records one unit more than its maximum capacity, i. e. in the decimal system, when it passes from 9 to 0, or from the position represented in Figure 2 to that represented in Figure 3.

A second part comprises two diametrically opposite sets of two teeth 27 which cooperate with the toothed wheel of the next higher order to cause them to advance two teeth, i. e. to record one unit, for each 180° rotation of said carry-over pinion, everytime it is released.

It will be realized that with this device, it is the carry-over shaft 11 which drives directly the carry-over pinions, normally locked as soon as they are released by the unlocking cam of the next lower order.

The speed of rotation of the carry-over shaft 11 may be chosen slightly higher than that which would be necessary for an absolute equality between the circumferential speeds of the carry-over pinions and those of the toothed wheels of the recorder with which they cooperate, in such a manner that the carry-over on the toothed wheel of one order not only does not require any additional effort from the toothed wheel of the next lower order but even decreases the effort necessary for driving this toothed wheel.

The toothed wheel 4 is represented in Figure 2 in the angular position it occupies when it has recorded 9 units and in Figure 3 just after a carrying over when it records no unit.

Figure 4:
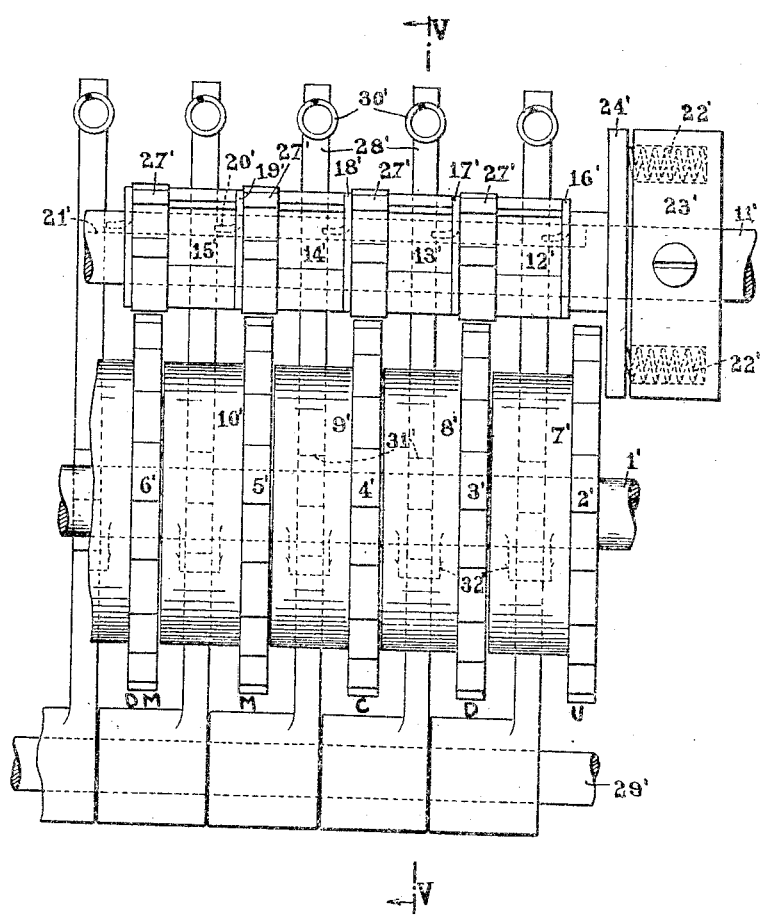
Figure 4 is a view in elevation of a modification of the first mode of embodiment of the invention.
Figure 5:
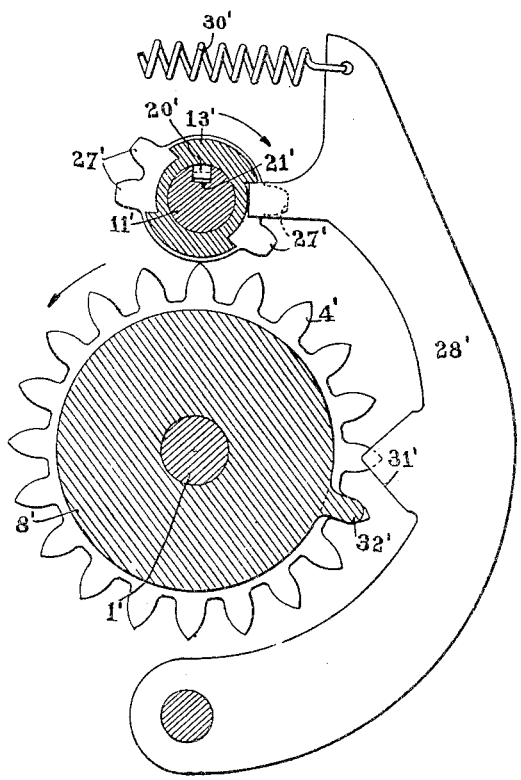
Figure 5 is a view in section along line V—V of Fig. 4.

In the mode of embodiment shown in Figures 4 and 5, the spacing between the recording toothed wheels for the tens 2, hundreds 3, etc. is larger than is necessary for housing the elements of the carry-over system; it corresponds to the spacings of the perforations in a recording card; such cards being capable of being used in machines comprising this mechanism.

While in the mode of embodiment shown in the previous figures, the carry-over pinions exerted some friction on the corresponding unlocking cams and consequently braked slightly the toothed wheels associated with these cams, no friction is exerted on the unlocking cams, or on the toothed wheels in the modified embodiment which is the object of Figures 4 and 5.

With each carry-over pinion 12', 13', 14', 15' is associated a locking lever 28' mounted for pivoting about an axle 29' and which a return spring 30' constantly tends to bring back to the position shown in Figure 5 in which it locks the carry-over pinion with which it is associated; this locking lever is provided on its edge facing the driving axle of the toothed wheels, with a boss 31' capable of cooperating with the single boss 32' comprised in each one of the unlocking cams.

The operation is as follows:

The carry-over pinions are normally locked by the locking lever when a toothed wheel records one unit more than its maximum recording capacity, i. e. the tenth unit in the case of the decimal system, the boss 32' of the unlocking cam acting on the boss 31' of the locking lever pivots the latter about its axle 29' in such a manner that it immediately releases the corresponding carry-over pinion; the latter is immediately driven in rotation by the associated friction washer and goes through a 180° rotation before it is again locked; during this 180° rotation, the two toothed wheels 27' of one of the two sets of toothed wheels it comprises cause a rotation by two teeth, i. e. one unit, of the toothed wheel of the next higher order.

The only effort required from the toothed wheels thus takes place at the time of the carry-over and consists in over-coming the action of the spring 30' for causing the pivoting of the locking lever 28'; it will be realized that this effort may be quite small.

Figure 5, like Figure 2, represents the toothed wheel 4' in the angular position it occupies when it has recorded nine units, and is thus ready to cause a carrying over.

Figure 6:
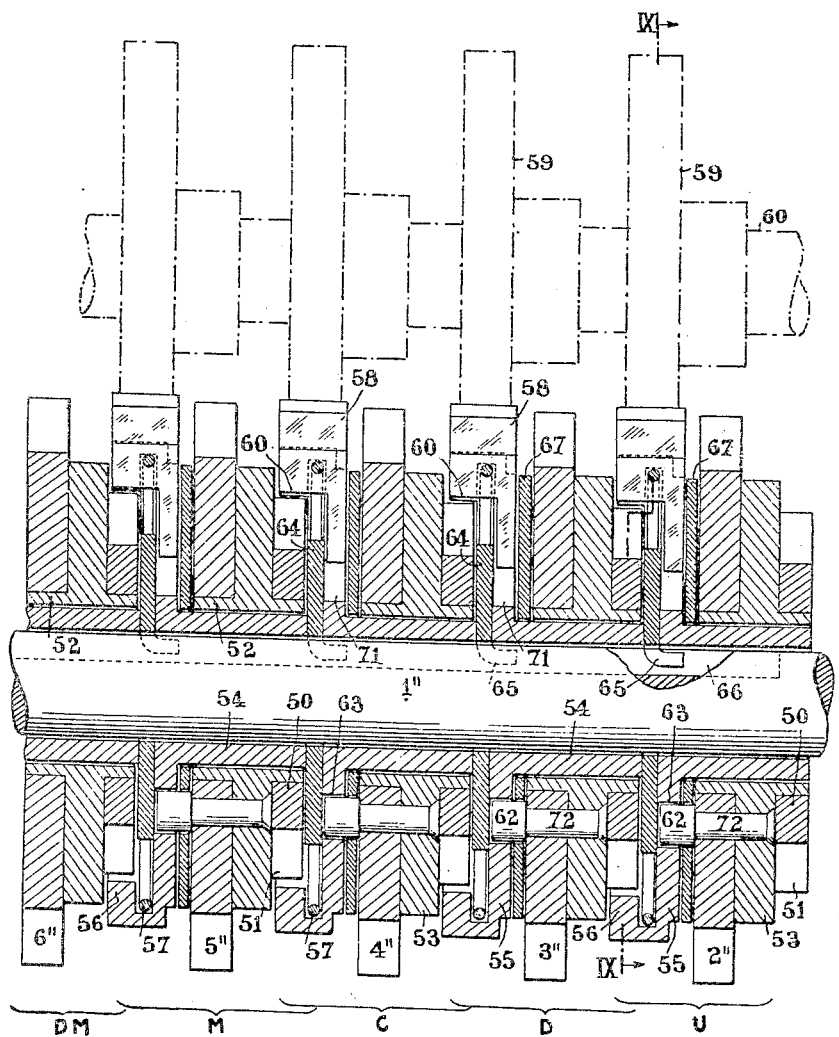
Figure 6 is a view in longitudinal section of a second mode of embodiment.
Figure 7:
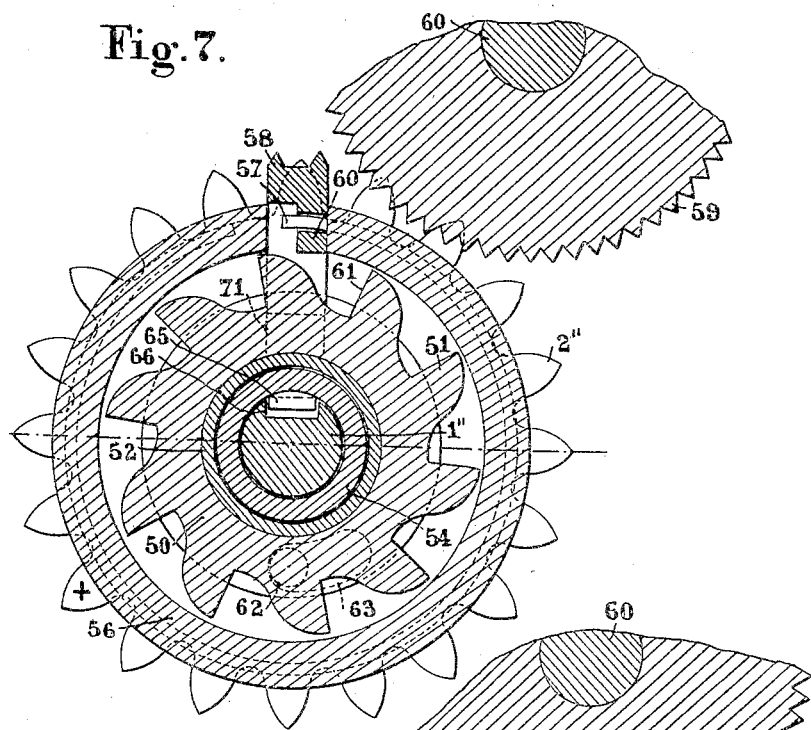
Figures 7 and 8 are views in transverse section along lines IX—IX in Fig. 6, showing the elements in two different positions.
Figure 8:
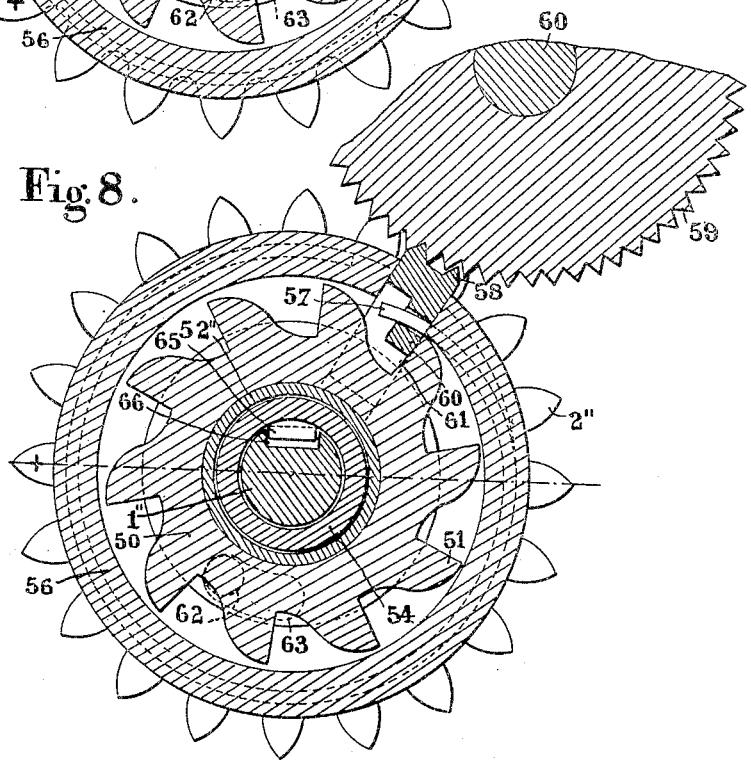

Each one of the toothed wheels 2", 3", 4", 5", 6" of the mode of embodiment represented in Figures 6 to 8 is fastened to a ratchet 50 comprising 10 teeth 51, placed on the side of the toothed wheel of the next lower order, the toothed wheel of the lowermost order only not comprising possibly such a ratchet.

The toothed wheels 2", 3", 4", 5" and 6", and the corresponding ratchets 50 are each mounted on one common hub 52 comprising a spacing disc 53 mounted itself on a hub 54 associated with a flange 55 and a crown 56 inside which is compressed an annular spring 57, one end of which acts on the carry-over finger 58 which is thus constantly pushed towards the periphery.

Each one of these crowns 56 is in the immediate vicinity of a carry-over pinion 59 keyed on an auxiliary shaft 60 driven in rotation at a peripheral speed equal at least to that of the finger 58.

The finger 58 may slide radially in a notch 71 provided to that effect in the crown 56 and in the flange 55; in its normal position, it can turn without meeting the teeth 51 of the ratchet 50 of the next higher order.

When however the tooth wheel cooperating with it takes one tooth more than its maximum capacity, it is in such an angular position that the finger 58 comes in contact with the outer teeth of the carry-over pinion 59, and is pushed radially back towards the center, against the opposing action of the corresponding spring 57; its recess 69 then comes in contact with the radial face 61 of the tooth 51 of the toothed wheel of the next higher order for driving the latter in rotation by one tooth and consequently for carrying over one unit on the toothed wheel of the next higher order.

As may be seen in Figure 6 for the hundreds wheel 4", the ratchet 50, the spacing disc 53 and each one of the toothed wheels such as 4" are associated in rotation by a rod 72 terminating into a stud 62 engaged in a window 63 provided to this effect in the flange 55 of the disc 56 by means of which this disc is driven positively by the corresponding toothed wheel.

This window 63, however, is oblong, which enables the corresponding disc to rotate independently of the toothed wheel cooperating therewith at a higher speed than the latter and thus to take a certain advance on it when it is driven positively, by means of its finger 58 by the carry-over pinion 59.

For preventing any untimely driving of a ratchet 50 by the flange 55 of the toothed wheel of the next lower order, a fixed disc 64 may be arranged between them, provided with a tail piece 65 engaged in a rib 66 of the fixed axle 1", a spacer disc 67 is arranged between each toothed wheel 2", 3" . . . and the flange 55 of the corresponding crown 56.

The operation is as follows:

The toothed wheels 2" to 6" can rotate freely and independently on their common axle 1", each one of them driving the ratchet 50 and the crown 56 corresponding thereto; in fact, as indicated above, the fingers 58 are periodically pushed back by the spring 57 and their recess turns without meeting the radial face 61 of the teeth of the ratchet of the next higher order.

It is only at the time when the toothed wheel records one unit more than its maximum capacity that the finger 58 comes in contact with the corresponding carry-over pinion 59 constantly driven in rotation by the shaft 60 at a peripheral speed higher than its own; it is then displaced radially towards the center and its recess meets the radial face of one of the teeth of the ratchet of the next higher order, which it drives in rotation at the same time as the toothed wheel of the next higher order. The dimensions of the finger 58 are so calculated that this driving in rotation corresponds to the recording of one unit in said toothed wheel of the next higher order and consequently the carrying over of one unit is thus recorded; the finger is then pushed back peripherally by its spring and the fixed disc 64 prevents any additional rotation of said toothed wheel of the next higher order.

It will be realized that such an arrangement only allows positive carrying over; in order to enable it to make negative carry-overs, it would be sufficient to turn the ratchet 50 end to end so that the radial face 61 of its teeth 51 be arranged for allowing its driving in the opposite direction.

A carry-over system of the same type may also be used making it possible, without a slight modification as described below, to make positive or negative carry-overs.

Figure 10:
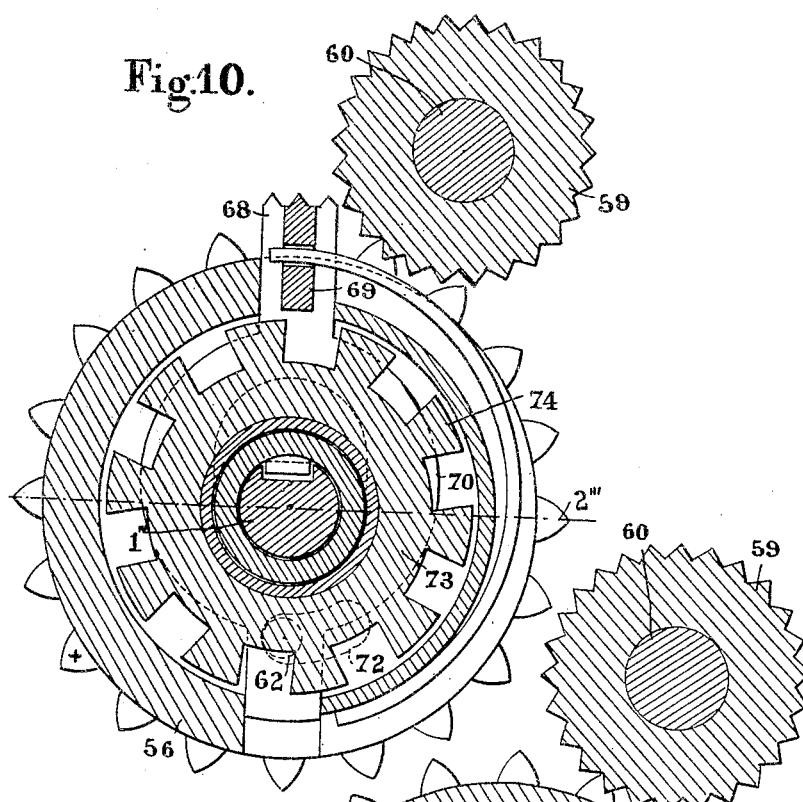
Figures 10 and 11 are views in transverse section showing the elements in two different positions.
Figure 11:
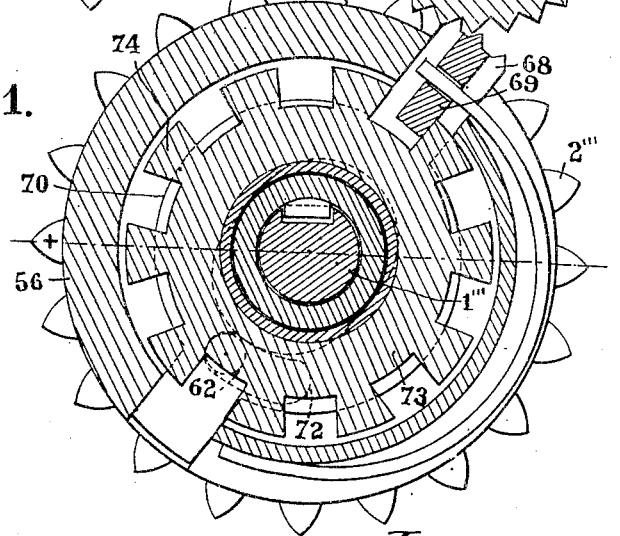

To this effect, as shown more especially in Figures 10 and 11, the ratchet 73 comprises teeth 74 symmetrical with respect to a radial plane; the finger 68 which cooperates as previously with a carry-over pinion 59 keyed on an auxiliary shaft 60 driven in rotation at a peripheral speed at least equal to its own, is provided with a recess 69 symmetrical with respect to a radial plane, so as to be able to cooperate in the same conditions with one or the other face of any one of the teeth 74 of the ratchet 73 and thus cause either a positive or a negative carry-over.

Figure 9:
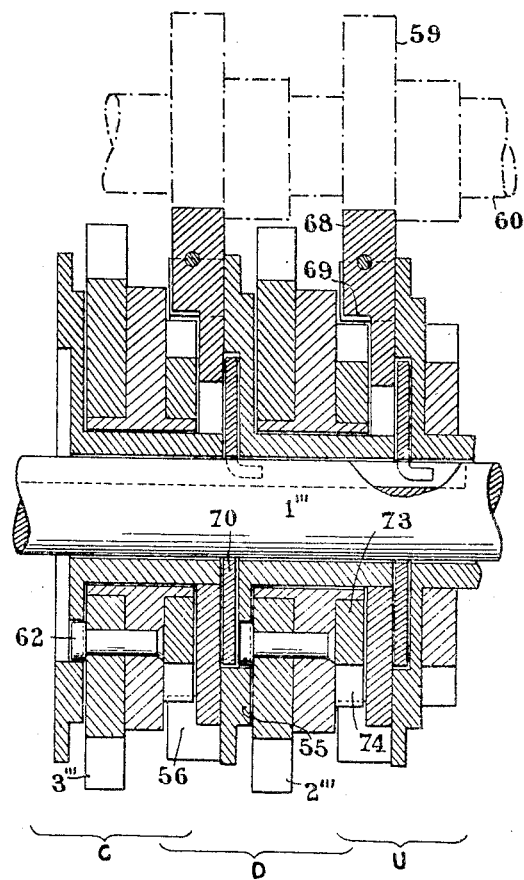
Figure 9 is a view similar to Fig. 6 showing a modified embodiment.

The mounting of the device according to Figures 9 and 10 in addition, is slightly different from the one described above; thus the finger 68 is associated with a crown 70 arranged about an axle 1''' and may thus be stacked with the toothed wheels 2''' to 6'''; the spacing washer 67 has been omitted; it is integral with the flange 55 of the crown 56.

The operation is identical except for this point.

What I claim is:

1. A carry-over device for a calculating machine in which the results of operations are recorded on toothed wheels assigned each one of them to a predetermined order, comprising a carry-over control shaft driven constantly in rotation, synchronously with the control shaft for the machine, carry-over pinions mounted on said carry-over control shaft, equal in number to the number of the toothed wheels less one, each one of them cooperating with a toothed wheel, and designed for being capable of causing said toothed wheel to record carry-overs, and means assigned to each pinion and driven each one of them by the toothed wheel of the next lower order to that with which said carry-over pinion cooperates, designed for making said carry-over pinion active, and causing it to record one unit on the toothed wheel with which it cooperates when the toothed wheel of the next lower unit records one unit more than its maximum capacity, i. e. ten units in the case of the decimal system.

2. A carry-over device according to claim 1, wherein the means assigned to each carry-over pinion are designed for preventing normally said pinion from being driven in rotation by the carry-over control shaft and for releasing it momentarily at the time when the toothed wheel which controls it records one more unit than its maximum capacity.

3. A carry-over device according to claim 2 in which the carry-over control shaft drives the carry-over pinions by friction.

4. A device according to claim 3 wherein the carry-over pinions are mounted free and slide freely on the carry-over shaft friction washers driven positively in rotation by the carry-over shaft and capable of sliding freely thereon, are interposed between adjacent pinions, and springs acting parallel to the carry-over shaft ensure a uniform pressure on all said pinions and washers, sufficient though very small for driving in rotation any one of said pinions as soon as it is released.

5. A device according to claim 3 wherein an unlocking cam is associated in rotation with each toothed wheel and is designed for normally locking the corresponding carry-over pinion and for releasing it momentarily when the toothed wheel effects the rotation corresponding to the recording of one more unit than its maximum capacity, i. e. when it passes from 9 to 0 in the case of the decimal system.

6. A device according to claim 1, wherein the carry-over pinions are constantly driven positively without any braking by the auxiliary control shaft.

7. A device according to claim 6 wherein a ratchet arranged on the side of the toothed wheel of the next lower order is fastened to each toothed wheel, except that of the lowermost order, a device arranged on the side of the toothed wheel of the next higher order, and capable of cooperating with the ratchet of said toothed wheel of the next higher order, is driven by each toothed wheel except that of the lowermost order, said device not cooperating, in normal position, with said ratchet of the toothed wheel of the next higher order, and the carry-over pinion corresponding to said toothed wheel of the next higher order cooperates with this device, each time said toothed wheel records one unit more than its normal capacity displaces it in a position in which it cooperates with the ratchet of the toothed wheel of the next higher order and then drives it itself in rotation at a peripheral speed equal at least to that at which it is driven in rotation by the toothed wheel, so that it rotates by one tooth the ratchet of the toothed wheel of the next higher order and consequently causes the carrying-over of one unit on said toothed wheel of the next higher order.

8. A device according to claim 7, wherein the device arranged on each toothed wheel except that of the highest order cooperating with the ratchet of the toothed wheel of the next higher order is constituted by a finger designed for being able to slide radially inwards when it comes in contact with the corresponding carry-over pinion and wherein a spring pushes back said finger normally towards the periphery, said finger having a recess capable of cooperating with one tooth of the ratchet of the toothed wheel of the next higher order when it is pushed back towards the center by its carry-over pinion.

No references cited.